United States Patent [19]

Uebbing

[11] Patent Number: 4,952,949
[45] Date of Patent: Aug. 28, 1990

[54] LED PRINTHEAD TEMPERATURE COMPENSATION

[75] Inventor: John J. Uebbing, Palo Alto, Calif.

[73] Assignee: Hewlett-Packard Company, Palo Alto, Calif.

[21] Appl. No.: 442,197

[22] Filed: Nov. 28, 1989

[51] Int. Cl.⁵ ............................................. G01D 15/14
[52] U.S. Cl. .................................................... 346/154
[58] Field of Search .................... 346/154, 160, 107 R; 355/1; 400/53; 358/300

[56] References Cited

U.S. PATENT DOCUMENTS

| | | | |
|---|---|---|---|
| 4,455,562 | 6/1984 | Dolan et al. | 346/154 |
| 4,525,729 | 6/1985 | Aguinek et al. | 358/300 X |
| 4,571,602 | 2/1986 | DeSchamphelaere et al. | 346/154 X |
| 4,857,944 | 8/1989 | Hart et al. | 346/154 |
| 4,878,072 | 10/1989 | Reinten | 346/154 |

Primary Examiner—Donald A. Griffin

[57] ABSTRACT

The light output of light emitting diodes on an LED printhead for a photosensitive printer is temperature compensated so that light output remains constant regardless of temperature changes of the LED chips. An LED chip has a plurality of exposure LEDs and a dummy LED. The voltage across the dummy LED is sensed and combined with an adjustable reference voltage. This provides the input to an op-amp, the output of which provides a chip reference voltage which controls the current to the LEDs.

25 Claims, 1 Drawing Sheet

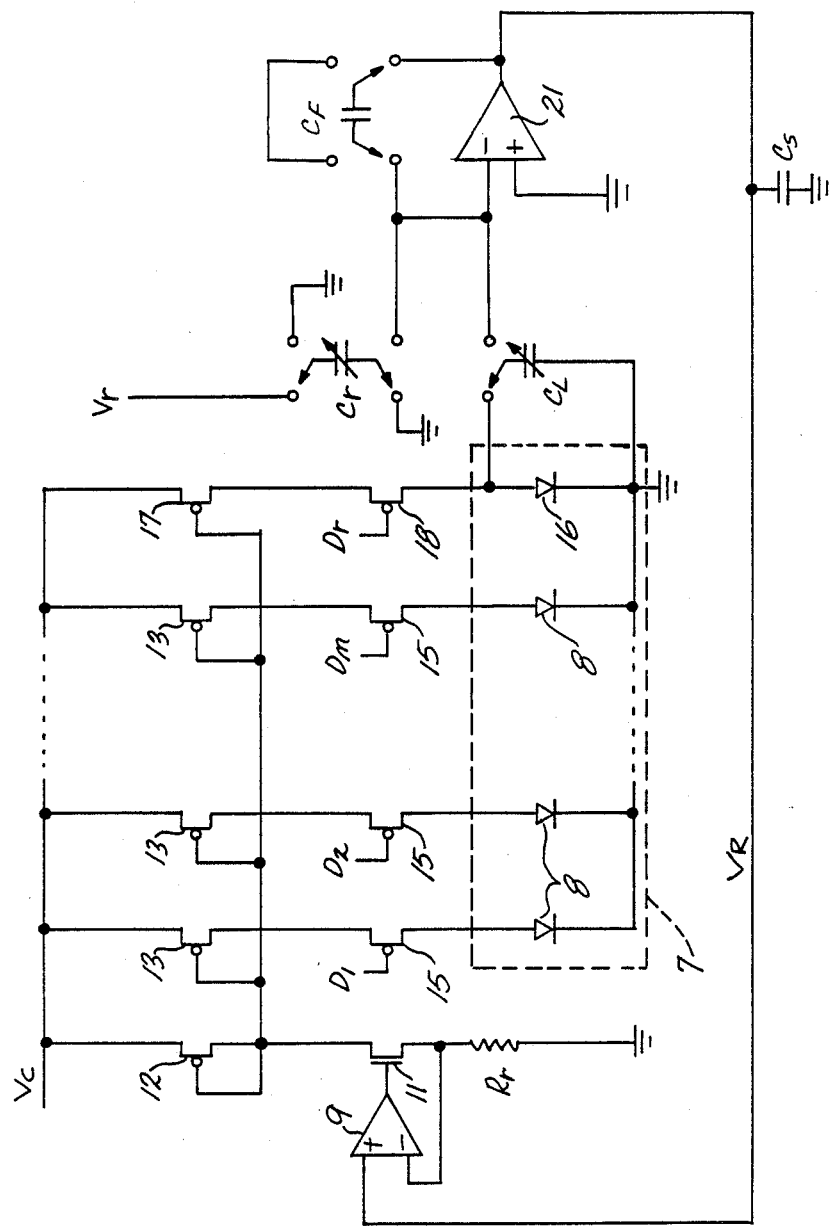

LED PRINTHEAD TEMPERATURE COMPENSATION

BACKGROUND OF THE INVENTION

It has become desirable to employ non-impact xerographic or other photosensitive printers for text and graphics. In a xerographic printer, an electrostatic charge is formed on a photoreceptive surface of a moving drum or belt, and selected areas of the surface are discharged by exposure to light. A printing toner is applied to the drum and adheres to the areas having an electrostatic charge and does not adhere to the discharged areas. The toner is then transferred to a sheet of plain paper and is heat-fused to the paper. By controlling the areas illuminated and the areas not illuminated, characters, lines and other images may be produced on the paper.

One type of non-impact printer employs an array of light emitting diodes (commonly referred to herein as LEDs) for exposing the photoreceptor surface. A row, or two closely spaced rows, of minute LEDs are positioned near an elongated lens array so that their images are arrayed across the surface to be illuminated. As the surface moves past the line of LEDs, they are selectively activated to either emit light or not, thereby exposing or not exposing, the photoreceptive surface in a pattern corresponding to the LEDs activated.

To form good images in an LED printer, it is desirable that all of the light emitting diodes produce controlled light output when activated. This assures a uniform quality image all the way across a paper for black and white printing, and control of exposure for grey scale printing. The light output from an LED depends on a number of factors including current and temperature.

Light emitting diodes for print heads are formed on wafers of gallium arsenide or the like, suitably doped to conduct current and emit light. Long arrays of LEDs are formed on a wafer which is cut into separate chips each having an array of LEDs. A row of such chips are assembled end-to-end on the print head. The LEDs are driven by power supplies on nearby integrated circuit chips. Typically, an integrated circuit chip provides constant current for all the LEDs on an LED chip, or sometimes two integrated circuit chips each provide current for half of the LEDs on an LED chip.

The light output of an LED varies with temperature. It is important for some applications such as grey scale printing that the light output be uniform over time. For black and white printing it is important that the light output be reasonably uniform across the width of the printhead. Depending on the past history of power dissipation in the printhead, some LED chips may be much warmer than others, thereby causing a significant nonuniformity in light output. Hence, exposure of the photosensitive medium temperature may also vary with time.

The light output varies as much as $-0.9\%$ per degree Centigrade and since appreciable temperature differences may occur during operation of the printhead, there may be substantial exposure differences as temperature varies across the head and as a function of time. It is therefore desirable that compensation be provided for temperature changes that may occur during operation of an LED printhead.

SUMMARY OF THE INVENTION

There is, therefore, provided in practice of this invention according to a presently preferred embodiment, a temperature compensated power supply for a light emitting diode print head. Such a printhead has a plurality of LED chips, each of which has a plurality of exposure LEDs. A dummy diode is provided for each chip with means for passing current through the diode and sensing voltage across the diode. The current passed through the exposure LEDs on the respective chip are then adjusted in response to the sensed voltage across the dummy diode. Preferably the dummy diode is an LED on the same chip as the exposure LEDs.

In an exemplary embodiment, the temperature compensated LED printhead has a compensation op-amp and means for generating a compensation voltage as a function of the sensed voltage. The compensation voltage is applied to the inverting input of the compensation op-amp. The op-amp output is used for generating a chip reference voltage which controls current through the exposure LEDs.

BRIEF DESCRIPTION OF THE DRAWING

These and other features and advantages of the present invention will be appreciated as the same becomes better understood by reference to the following detailed description when considered in connection with the accompanying drawing which illustrates a temperature compensated power supply circuit for an LED chip.

DETAILED DESCRIPTION

An exemplary light emitting diode (LED) printer has a printhead with a row of LED chips along its length. An exemplary chip 7 has a plurality of exposure LEDs 8 along its length. The exposure LEDs are selectively activated for exposing the photosensitive surface of a xerographic printer in desired patterns. During printing, selected ones of the LEDs are activated for exposing selected pixels in a row across the surface. A short interval later selected LEDs across the row are again activated. Thus, the exposure comprises a series of rows of exposed dots. There is a brief interval between the rows. During this short interval temperature of the LED chip is sensed in the practice of this invention.

Power is supplied to the LEDs from integrated circuit chips mounted in close proximity to the LED chips. In an exemplary embodiment, an integrated circuit chip is located on each side of each LED chip and contains circuits for delivering current to half of the LEDs on the LED chip. Thus, an exemplary integrated circuit chip may have 48 current sources for the respective LEDs. Such a chip may include a variety of other print head operational circuits which do not form a part of this invention. For example, data signal multiplexing circuits may be included on the chip. The drawing illustrates schematically the power supply portion of an integrated circuit chip for providing current for activating the LEDs on an LED chip. The components illustrated are repeated several times across a printhead.

There may be differences between the various LED chips on the printhead due to processing variables during manufacture of the chips. It may also have different temperatures due to differences in the cycle during printing. Thus, power is separately controlled to each LED chip. Generally it is desirable that the current available for each LED on a chip be substantially the same so that the light output of each LED is substantially the same. For this purpose a plurality of current mirrors controlled by a high reference voltage are employed.

Each integrated circuit chip is provided with a reference resistor $R_r$, the value of which may be selected for assuring that all of the integrated circuit and LED chips on a given print head produce substantially the same light output.

A portion of the circuits on a representative integrated circuit chip are illustrated in the drawing. In this drawing, the dashed line indicates the portion on the LED chip. The balance or the circuit elements are typically on the integrated circuit chip, except for the reference resistor and a capacitor mentioned later. Contact pads for making connections to the chips are omitted from the drawing, as are many other details of circuits which are not material to an understanding of this invention.

A reference voltage, $V_R$, is applied to the noninverting input to a difference amplifier 9 (commonly referred to as an op-amp) of a reference current cell on each chip. There is nothing remarkable about the op-amp current controller, and its internal circuits are, therefore, not illustrated. It comprises a conventional comparator circuit, an output buffer for the comparator, a compensation capacitor to prevent oscillations, and a bias circuit for the comparator and buffer. The op-amp circuits are formed by the same processes employed for the balance of the circuitry on the integrated circuit chips.

The op-amp output is connected to the gate of an n-channel insulated gate field effect transistor 11 (IGFET or FET) which acts as a current regulator or current limiter. The source of the n-channel current regulator FET is connected to both the inverting input to the op-amp and the external reference resistor $R_r$. The drain of the current regulator FET is connected to the drain of a p-channel current source reference FET 12. The reference FET 12, as well as other components which provide current to the LEDs, are powered by a current supply voltage, $V_c$, common to the entire print head.

In the reference current cell the op-amp controls the gate of the n-channel current reference FET 12 and increases or decreases the gate voltage until the voltage at the reference resistor $R_r$ matches the reference voltage $V_R$ at the non-inverting input to the op-amp. The result is a chip reference current equal to $V_R/R_r$. Thus, the reference current cell produces a chip reference voltage at the drain of the reference FET 12. The internal or chip reference voltage is not the same as the external or system reference voltage $V_R$.

The chip reference voltage is tied to the gate of the reference FET. It is also connected to the gate of each of a plurality of similar p-channel output driver FETs 13 which provide current for respective exposure light emitting diodes 8. By having the gates of all of the output driver FETs 13 tied together to the chip reference voltage, the current for each driver is substantially identical. These can be thought of as current mirrors with the same current flow as in the constant reference current cell, or if desired, scaled to a uniform different current by having different parameters for the output FETs 13 as compared with the parameters of the reference FET 12.

Each of the output drivers 13 is in series with a p-channel data FET 15. The data FETs act as switches in response to presence or absence of a data signal $D_1$, $D_2$ ... $D_n$ applied to the gate of the respective data FET. By having independent drivers for each LED, the light output, rise time and the like is substantially identical for all of the LEDs. The current from each driver, and the respective rise and fall time, for each LED is substantially independent of the number of LEDs enabled. Nominal values for the reference resistor and chip reference voltage generate a nominal output current of five milliamps.

In addition to the exposure LEDs 8 on the LED chip, there is a dummy LED 16 which is essentially the same as the exposure LEDs but is covered with an opaque material so that light emitted by the dummy LED does not expose any of the photosensitive surface in the printer. A suitable opaque material is the metal used for making electrical contacts on the LED chip.

The dummy LED is in series with a driver FET 17, the gate of which is connected to the internal reference voltage, the same as the other driver FETs 13. The driver FET 17 for the dummy LED differs from the others by providing an appreciably lower current to the dummy LED, for example, in the order of 100 microamperes. The dummy LEd and its driver 17 are in series with a switching FET 18 which has a signal line $D_r$ connected to its gate. During the interval between the periods when the exposure FETs are turned on for exposing a line on the photosensitive surface, the signal $D_r$ switches the switching FET on for providing current to the dummy LED.

The dummy LED is used for sensing the temperature of the LED chip. The thermal conductivity of the chip material is high enough that the chip is substantially isothermal and a single dummy LED may be used for compensating for temperature variations for the entire chip. In an alternative embodiment, more than one dummy LED may be used on the chip and signals combined for providing a more sensitive temperature measurement and common mode rejection.

Temperature of the chip is sensed by sensing the forward voltage $V_F$ across the dummy LED 16. This voltage is then used to adjust the reference voltage $V_R$ applied to the op-amp 9. The temperature dependence of the light output of an LED can be very well represented by the equation $L = L_o e^{(-T/T_o)}$ where $T_o$ is on the order of 110° C. The actual $T_o$ may vary from chip to chip. Hence, the temperature coefficient for the chips may differ. Data representing the actual temperature coefficients for each LED chip are stored in a PROM (not shown) on the printhead and read out during operation of the printhead for adjusting the temperature compensation circuit as hereinafter described.

In addition, the light output of an LED is given as a function of current by the equation $$L/k = I + (z/2) - \sqrt{(z/2)^2 + zI}$$

where k is a constant, I is current and z is a measure (in amperes) of the nonradiative current losses of the LED.

The forward voltage of a GaAsP diode emitting at 685 nanometers has the form $$V_F = 1.54 e^{-0.00145(T-25)}$$

where T is the temperature in degrees Centigrade. This forward voltage is sensed and used for compensating the LED chip for temperature changes. Briefly stated, the forward voltage is amplified, combined with a constant voltage and the resulting compensation voltage used to set the LED current by way of the internal reference voltage applied to the driver FETs 13. In this way the light output of the LEDs on the chip is substantially uniform regardless of changes in temperature.

The forward voltage $V_F$ across the dummy LED is used for charging an LED sensing capacitor $C_L$ which thereby stores the voltage. At the same time a reference capacitor $C_r$ is charged by an external reference voltage $V_r$ which thereby stores the reference voltage. These capacitors are switched for storing the voltages during the interval when the switching FET 18 is ON for passing current through the dummy LED.

The capacitors are then switched to an output where the two capacitors are, in parallel, connected to the inverting input of a compensation op-amp 21. At the same time, a feedback capacitor $C_F$ is switched across the output to input of the compensation op-amp for influencing the gain of the op-amp. The output of the compensation op-amp provides the reference voltage $V_R$ which is applied to the noninverting input to the reference current op-amp 9.

A storage capacitor $C_s$ is connected to the reference voltage line for remembering the reference voltage during the interval when the compensation op-amp is essentially turned off while the other capacitors are switched to sensing the LED forward voltage and the reference voltage. During this off period, the feedback capacitor $C_F$ is shorted for draining its charge and not influencing the feedback of the compensation op-amp in the next compensation cycle. It may be desirable to have the storage capacitor $C_s$ a discrete component off of the silicon integrated circuit chip so that it can have substantial capacitance and maintain the reference voltage without significant draining.

By switching the LED and reference capacitors $C_L$, $C_r$ in parallel as shown in the drawing, the combined capacitance of the capacitors is applied to the input to the compensation op-amp 21. The input compensation voltage $V_i$ to the compensation op-amp is then $$V_i = \frac{C_L V_F + C_r V_r}{C_r + C_L}$$

The gain of the compensation op-amp is $$\frac{C_r + C_L}{C_F}$$

If we represent the voltage across an LED by the formula $V_F = V_{Fo} + k\Delta T$, then the current in an LED as a function of temperature is $$I_L = \frac{1}{R_r C_F} C_r V_r - C_L V_{Fo} + C_L k \Delta T$$

The reference capacitor $C_r$ and LED voltage sensing capacitor $C_L$ are adjustable by way of data stored in a PROM (not shown) on the printhead. As is well known, adjustable capacitors can be provided in an integrated circuit by having a plurality of capacitive areas of different sizes which are selectively switched into parallel to provide a desired capacitance. The data stored in the PROM for setting the adjustable capacitors is provided in an initial calibration of the printhead.

The technique for adjusting the reference and LED sensing capacitors comprises, in effect, measuring the external reference voltage $V_r$ ambient temperature forward voltage $V_{Fo}$ of the dummy LED and the constant k. A simple way to do this is to initially set the two adjustable capacitors to their nominal values by loading some beginning data into the PROM. In an exemplary embodiment where the external reference voltage is 2.5 volts, the ambient temperature forward voltage $V_{Fo}$ of the LED is nominally 1.6 volts, the constant k is nominally 2 millivolts per degree Centigrade and the required compensation in the LED current $I_L$ is about 1% per degree Centigrade, the capacitance of the LED sensing capacitor $C_L$ should be about 1.5 times larger than the reference capacitor $C_r$.

After the nominal capacitance values are set, the capacitors are adjusted up and down together maintaining the 1.5:1 ratio until the appropriate LED current $I_L$ is obtained. Then by measuring the coefficient of change of LED current $I_L$ with small changes in the reference capacitance $C_r$ and LED sensing capacitance $C_L$, the ratio of changes in capacitance $R_C$ that will the LED current $I_L$ constant can be determined.

Then the printhead is heated up to some temperature such as 50° C. The LED sensing capacitance $C_L$ (which helps determine the gain of the temperature compensation) is then adjusted to give the same light output from an LED at 50° C. as it had at the starting temperature. However, when the LED sensing capacitance $C_L$ is changed, the reference capacitance $C_r$ is also changed by the ratio $R_C$ previously determined. This assures that the nontemperature-dependent part of the LED current remains constant during the adjustment of the temperature compensation. By adjusting the two capacitances to give the proper current at two temperatures, the proper current is obtained throughout the temperature range.

Although but one embodiment of temperature compensated power supply for an LED printhead has been described and illustrated herein, many modifications and variations will be apparent to those skilled in the art. Thus, for example, although the switched capacitance technique for applying the sensed forward voltage of the dummy diode to an op-amp provides a simple technique easily implemented on a silicon integrated circuit chip, other techniques for employing the forward voltage of the LED for adjusting the chip reference voltage may be employed.

The calibration technique described adjusts the reference capacitor and the LED voltage sensor capacitor for obtaining the desired temperature compensation. This is probably the simplest calibration technique. One could, however, adjust the op-amp feedback capacitance instead of one of the input capacitances. The algorithm for doing this is somewhat more complicated and may require iterations to obtain the desired accuracy of calibration.

The temperature compensation is described as occurring between each line of printing, and that probably provides the optimum. It will be apparent that compensation between pages or at other intervals may also be practiced.

One may also choose to employ a diode on the silicon integrated circuit chip instead of the dummy LED on the LED chip. An approximation of the temperature compensation may be obtained since coefficients are similar and the temperature of the integrated circuit chip tends to be proportional to the temperature of the LED chip. This is the case since both are mounted on a common heat sink and the power dissipations in the LED chip and integrated circuit chip are proportional during operation of the printhead.

The invention has also been described in the context of a xerographic printer where the surface exposed is selectively discharged by exposure to light. It will be apparent that this invention may be used with other photo-sensitive elements such as photographic film or paper.

With such possible variations in mind, it will, therefore, be understood that within the scope of the appended claims the invention may be practiced otherwise than as specifically described.

What is claimed is:

1. A method for compensating for temperature variations in a light emitting diode printhead for a photosensitive printer comprising the steps of:
   sensing the voltage across a dummy light emitting diode on the same chip with a plurality of exposure diodes; and
   adjusting a chip reference voltage which controls LED current as a function of the sensed voltage for compensating for changes in the temperature of the dummy light emitting diode.

2. A method as recited in claim 1 wherein the adjusting step comprises combining the sensed voltage and a constant voltage for obtaining a compensation voltage, and applying the compensation voltage to the input of an op-amp, the output of the op-amp providing the chip reference voltage.

3. A method as recited in claim 2 further comprising the step of adjusting the gain of the op-amp as a function of variation of LED light output with respect to temperature.

4. A method as recited in claim 2 wherein the adjusting step comprises:
   applying the compensation voltage to the inverting input of an op-amp; and
   adjusting the gain of the op-amp based on the light output of the LEDs as a function of temperature.

5. A method as recited in claim 1 comprising sensing the voltage across the dummy LED when the exposure LEDs are turned off.

6. A method as recited in claim 1 comprising the step of storing the reference voltage during an interval when the exposure LEDs are enabled.

7. A method as recited in claim 1 comprising the steps of:
   storing a reference voltage in a capacitor;
   storing the sensed voltage in a capacitor; and
   connecting both capacitors in parallel to the input of an op-amp, the output of the op-amp providing the chip reference voltage.

8. A method as recited in claim 7 wherein each of the capacitors is adjustable and is set at a capacitance value which collectively represents the temperature coefficient of the LEDs.

9. A method for compensating for temperature variations in a light emitting diode chip having a plurality of exposure diodes comprising the steps of:
   sensing the voltage across a dummy diode;
   adjusting an amplifier output as a function of the sensed voltage; and
   applying the amplifier output as a chip reference voltage for controlling current to the exposure diodes.

10. A method as recited in claim 9 wherein the dummy diode comprises a light emitting diode on the same chip as the exposure diodes.

11. A method as recited in claim 9 wherein the adjusting step comprises adjusting the gain of the amplifier as a function of variation of LED light output with respect to temperature.

12. A method as recited in claim 9 wherein the adjusting step comprises capacitively connecting the sensed voltage to the input of the amplifier.

13. A method as recited in claim 12 wherein the step of capacitively coupling comprises:
   storing the sensed voltage in a first capacitor;
   storing a constant voltage in a second capacitor; and
   connecting both capacitors in parallel to the input of the amplifier.

14. A method as recited in claim 9 wherein the adjusting step comprises adjusting the gain of the amplifier in response to variation LED light output as a function of temperature.

15. A method as recited in claim 9 wherein the adjusting step comprises combining the sensed voltage and a constant voltage for providing a compensation voltage, and applying the compensation voltage to the input of the amplifier.

16. A method as recited in claim 9 comprising the steps of:
   storing a reference voltage in a first capacitor;
   storing the sensed voltage in a second capacitor; and
   connecting both capacitors in parallel to the inverting input of an op-amp, the output of the op-amp providing the chip reference voltage.

17. A temperature compensated LED printhead for a photosensitive printer comprising:
   a light emitting diode chip having a plurality of exposure LEDs;
   means for generating a compensation voltage bearing a known relation to the temperature of the chip;
   a compensation op-amp;
   means for applying the compensation voltage to the inverting input of the compensation op-amp;
   means for adjusting the op-amp gain in response to changes in LED light output as a function of temperature;
   means for generating a chip reference voltage as a function of the output of the op-amp; and
   means for controlling current through the exposure LEDs in response to the chip reference voltage.

18. A temperature compensated LED printhead as recited in claim 17 wherein the means for generating a compensation voltage comprises a dummy LED on the chip, and the compensation voltage is a function of the voltage across the dummy LED.

19. A temperature compensated LED printhead as recited in claim 17 wherein the means for generating a compensation voltage comprises:
   a diode having a voltage drop which is a function of temperature;
   means for sensing a voltage across the diode; and
   means for combining the voltage with a constant voltage for generating the compensation voltage.

20. A temperature compensated LED printhead as recited in claim 17 wherein the means for applying the compensation voltage to the compensation op-amp comprises:
   first capacitive means for storing the compensation voltage;
   second capacitive means for storing the sensed voltage; and
   switching means for switching both capacitive means in parallel to the input of the compensation op-amp.

21. A temperature compensated LED printhead for a photosensitive printer, having a plurality LED chips on the printhead and a plurality of exposure LEDs on each chip comprising:
   a dummy diode for each chip;
   means for passing current through the diode;
   means for sensing voltage across the diode; and
   means for adjusting the current passed through the exposure LEDs on the respective chip in response to the sensed voltage.

22. A temperature compensated LED printhead as recited in claim 21 wherein the dummy diode comprises a dummy LED on each chip.

23. A temperature compensated LED printhead as recited in claim 21 comprising:
   a capacitor selectively connectable across the diode for storing the sensed voltage;
   means for combining the sensed voltage with a constant voltage for providing a compensation voltage;
   an amplifier; and
   means for applying the compensation voltage to the input of the amplifier, the current passed through the exposure LEDs being a function of the output of the amplifier.

24. A temperature compensated LED printhead as recited in claim 23 wherein:
   the means for combining comprises an adjustable capacitor for storing the constant voltage; and
   means for applying the voltages stored in both capacitors in parallel to the input of the amplifier.

25. A temperature compensated LED printhead as recited in claim 24 wherein the amplifier comprises an op-amp and comprising means for applying a feedback capacitor across the op-amp.

* * * * *